(12) United States Patent
Schüler et al.

(10) Patent No.: US 8,435,150 B2
(45) Date of Patent: May 7, 2013

(54) GEAR STAGE

(75) Inventors: Rolf Schüler, Heiligenhaus (DE); Bernd Bossmanns, Erkrath (DE); Karsten Kalmus, Bochum (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 334 days.

(21) Appl. No.: 12/739,252

(22) PCT Filed: Nov. 16, 2007

(86) PCT No.: PCT/DE2007/002118
§ 371 (c)(1),
(2), (4) Date: Apr. 22, 2010

(87) PCT Pub. No.: WO2009/052771
PCT Pub. Date: Apr. 30, 2009

(65) Prior Publication Data
US 2011/0319216 A1    Dec. 29, 2011

(30) Foreign Application Priority Data

Oct. 23, 2007 (DE) .......................... 10 2007 051 031

(51) Int. Cl.
*F16H 1/32* (2006.01)
(52) U.S. Cl.
USPC ........................................ 475/166; 475/168
(58) Field of Classification Search .................. 475/168, 475/166, 169; 192/38, 44, 45, 45.003; 464/35
See application file for complete search history.

(56) References Cited

U.S. PATENT DOCUMENTS

| | | | | | |
|---|---|---|---|---|---|
| 605,845 | A | * | 6/1898 | Belanger | 475/165 |
| 1,194,288 | A | * | 8/1916 | Grisdale, Jr. | 475/166 |
| 4,481,842 | A | * | 11/1984 | Nelson | 476/61 |
| 4,555,963 | A | * | 12/1985 | Nelson | 475/195 |
| 7,585,245 | B2 | * | 9/2009 | Schuler et al. | 475/166 |
| 7,614,974 | B2 | * | 11/2009 | Strobel et al. | 475/168 |
| 7,731,289 | B2 | * | 6/2010 | Matsumoto et al. | 297/362 |
| 2004/0209730 | A1 | | 10/2004 | Okoshi | |
| 2011/0037306 | A1 | * | 2/2011 | Schuler et al. | 297/353 |

FOREIGN PATENT DOCUMENTS

| | | |
|---|---|---|
| DE | 109463 | 9/1917 |
| DE | 69807777 | 1/2003 |
| DE | 102004019466 | 11/2005 |
| DE | 102005039733 | 3/2007 |
| EP | 1 323 909 | 7/2003 |
| JP | 2000016314 | 1/2000 |
| JP | 2002106662 | 4/2002 |
| JP | 2004190787 | 7/2004 |
| WO | WO 2004/055958 | 7/2004 |
| WO | WO 2007/022909 | 3/2007 |

* cited by examiner

*Primary Examiner* — Justin Holmes
*Assistant Examiner* — Stacey Fluhart
(74) *Attorney, Agent, or Firm* — McGlew and Tuttle, P.C.

(57) ABSTRACT

A gear stage (10), in particular of a vehicle seat (3), is embodied as a friction wheel gear stage. The gear stage includes a housing (5), a drive (12), an output (14) that is set off from the drive (12) by an excentricity (e) and at least one sphere (15) or another rolling body for the transmission of force between the drive (12) and the output (14). The position of the excentricity (e) relative to the housing (5) is arranged in a spatially fixed manner.

18 Claims, 7 Drawing Sheets

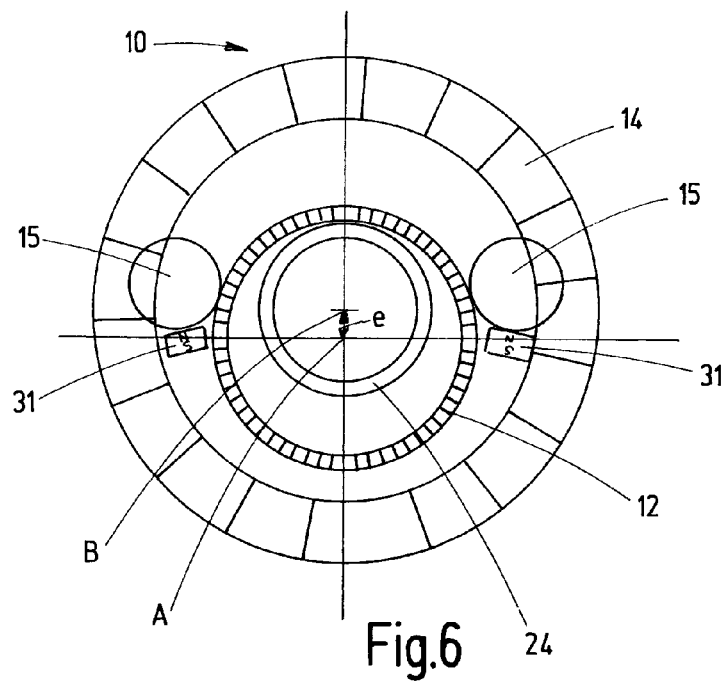
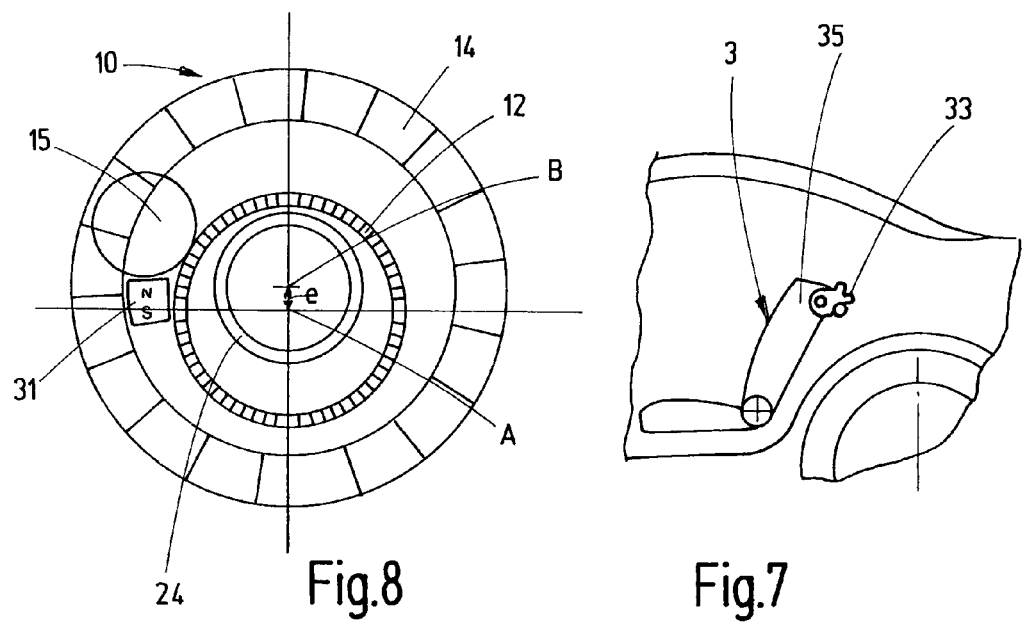

GEAR STAGE

CROSS REFERENCE TO RELATED APPLICATIONS

This application is a United States National Phase application of International Application PCT/DE2007/002118 and claims the benefit of priority under 35 U.S.C. §119 of German Patent Application DE 10 2007 051 031.6 filed Oct. 27, 2007, the entire contents of which are incorporated herein by reference.

FIELD OF THE INVENTION

The invention relates to a gear stage, in particular of a vehicle seat, having a housing, a drive input, a drive output which is spaced apart from the drive input by an eccentricity and having at least one ball or some other rolling body (a rolling body) which is provided for transmitting force between the drive input and drive output.

BACKGROUND OF THE INVENTION

In electric actuating drives for seat adjusters, gear stages are known which are designed as a rolling eccentric stage and which are used as intermediate gear stages or drive input elements for generating a rotating eccentricity for toothed gear stages. A known gear stage of the type which serves as a drive input of a second gear stage with a rotating eccentricity is illustrated in FIG. 14.

Although the expected properties of such rolling eccentric stages, specifically a transmission ratio in the range from 1.5 to 7 with a high efficiency and a low noise level, have indeed been realized in practice, the concept nevertheless has disadvantages which can be compensated only with a comparatively high level of expenditure. The eccentricity required for precise and uniform rolling of the toothed pinion in the ring gear, the magnitude of which eccentricity must remain as precisely constant as possible, arises in the known solutions from the combination of different geometries—for example the drive balls, which push the pinion upward in FIG. 14, a maximum limitation of the movement by the toothing, by the drive output bolts in the pinion bores or by a thrust bearing between the drive input and drive output, and a minimum limitation for example by a support ball. Overall, the relatively large number of components which form the eccentricity result in a system which, as a result of tolerances, load-dependent deformations and internal stresses, is extremely sensitive and susceptible to failure and which, under mass production conditions, can presumably be brought up to a good quality level only with a high level of expenditure.

As a further basic disadvantage, it should be stated that a rolling eccentric of the type can be formed effectively and simply as a drive input element which operates in one plane and with a single pinion (as illustrated in FIG. 14), but the radial bearing forces, proportional to the overall drive output torque, must be absorbed directly and entirely by the rotor bearing rotating at high rotational speed, and there, with increasing loading, lead to increasing power losses and therefore falling efficiency under relatively high operating load. In contrast, if two or ideally three pinions are arranged in planes one above the other in a known way, then the radial forces can support one another—but with the illustrated design, this is not possible by means of a simple arrangement of identical stages one above the other, because even minimal geometric differences of the components involved lead to fundamentally different transmission ratios, and therefore, during extended periods of operation, to a phase offset of the gear stages to one another and/or to stresses in the case of forced synchronicity, and therefore to losses.

SUMMARY OF THE INVENTION

The invention is based on the object of improving a gear stage of the type specified in the introduction. This object is achieved by means of a gear stage having the features according to the invention.

The drive input and drive output are rotatable about axes which are parallel to one another and which are offset with respect to one another by the eccentricity. The drive input and drive output are arranged, in spatial terms, one inside the other (nested) and act by means of the surfaces facing toward one another. In this case, the drive input may be arranged within the drive output (the drive input then acts by means of its outer contour and the drive output by means of its inner contour), or the situation is exactly reversed. The ball or other rolling body is arranged in the wedge gap formed (on account of the eccentricity) between the drive input and drive output, and can move within the wedge gap, in particular can move into and out of the wedge gap, with the movement generally taking place in a plane perpendicular to the axes of the drive input and drive output.

By virtue of the position of the eccentricity with respect to the housing in the gear stage, which is significant in terms of the generation of noise, being spatially fixed, which is preferably achieved by means of a fixed, that is to say spatially fixed mounting of the drive input and drive output in a common housing, the points of force engagement are fixed in space. With this extremely precise definition of the magnitude and direction of the eccentricity, the degree of eccentricity is positively adhered to precisely during the rotation, as a result of which periodic changes in the load conditions, and a generation of noise and vibrations, are prevented on account of the stable overall running properties. With this fixed position of the eccentricity between the drive input and drive output with respect to one another, a precise, freely-moving mounting of the components relative to one another and the use of a ball (or some other rolling body) in the wedge gap, firstly a high transmission ratio is obtained with a high level of efficiency, and secondly a radial force which is proportional to the respective torque is exerted as a preload on the rotor, which minimizes noises during operation.

The gear stage according to the invention is based on the same basic principle as the known gear stage. The transmission ratio can thus be set by means of contours on the drive input and/or drive output, for example by means of a groove within which the ball runs. The gear stage according to the invention, however, improves the properties with regard to transmission ratio, efficiency and lack of noise and, as is desired, preloads the rotor at all times, thereby eliminating the described disadvantages, in particular the generation of noise in EC drives with rotors of low mass and the low efficiencies of single-stage differential gears with a large step-down ratio. Besides the basic principle, numerous possible secondary functions and secondary properties are obtained, in particular various possibilities for changing and controlling the transmission ratio and simple solutions for clutch functions which, in the overall context of seat drive technology, can bring about numerous advantages. In one desired drive direction, provision is made of preferably precisely one rolling body, for example one roller, but preferably one ball, in order to avoid overdetermination. If only one direction is required, then also only a single ball or a single other rolling body is required.

Although a gear stage which looks basically similar is known from FR 601 616, the rolling bodies which are distributed over the entire circumference are mounted as planets on a web which rotates during operation, such that the eccentricity rotates.

The gear stage according to the invention is preferably used in an actuating drive for a vehicle seat, for example a backrest inclination adjuster, a height adjuster or an inclination adjuster. The actuating drive comprises a drive motor and the gear stage according to the invention, and drives for example a load-absorbing gearing as disclosed in DE 10 2004 019 466 B4 which forms a constituent part of the inherently movable seat structure. The actuating drive may if appropriate also have a second gear stage or further gear stages which are positioned downstream of the first gear stage according to the invention and upstream of the load-absorbing gearing. The load-absorbing gearing may perform a rotational movement or a linear movement or a superposition of both movements. The actuating drive may also be designed as or drive an actuator, for example rotate a cable drum which winds up a cable for unlocking Applications outside a vehicle seat are also conceivable, for example in window lifters and adjustable mirrors.

Below, the invention is explained in more detail on the basis of an exemplary embodiment illustrated in the drawing, with additions and modifications. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a cross sectional view through the first gear stage with magnets as pressure-exerting elements;

FIG. 7 is a schematic side view of a vehicle seat in a rear seat row;

FIG. 8 is a cross sectional view through the first gear stage with a damping and overrunning function;

DESCRIPTION OF THE PREFERRED EMBODIMENTS

Figure 1:
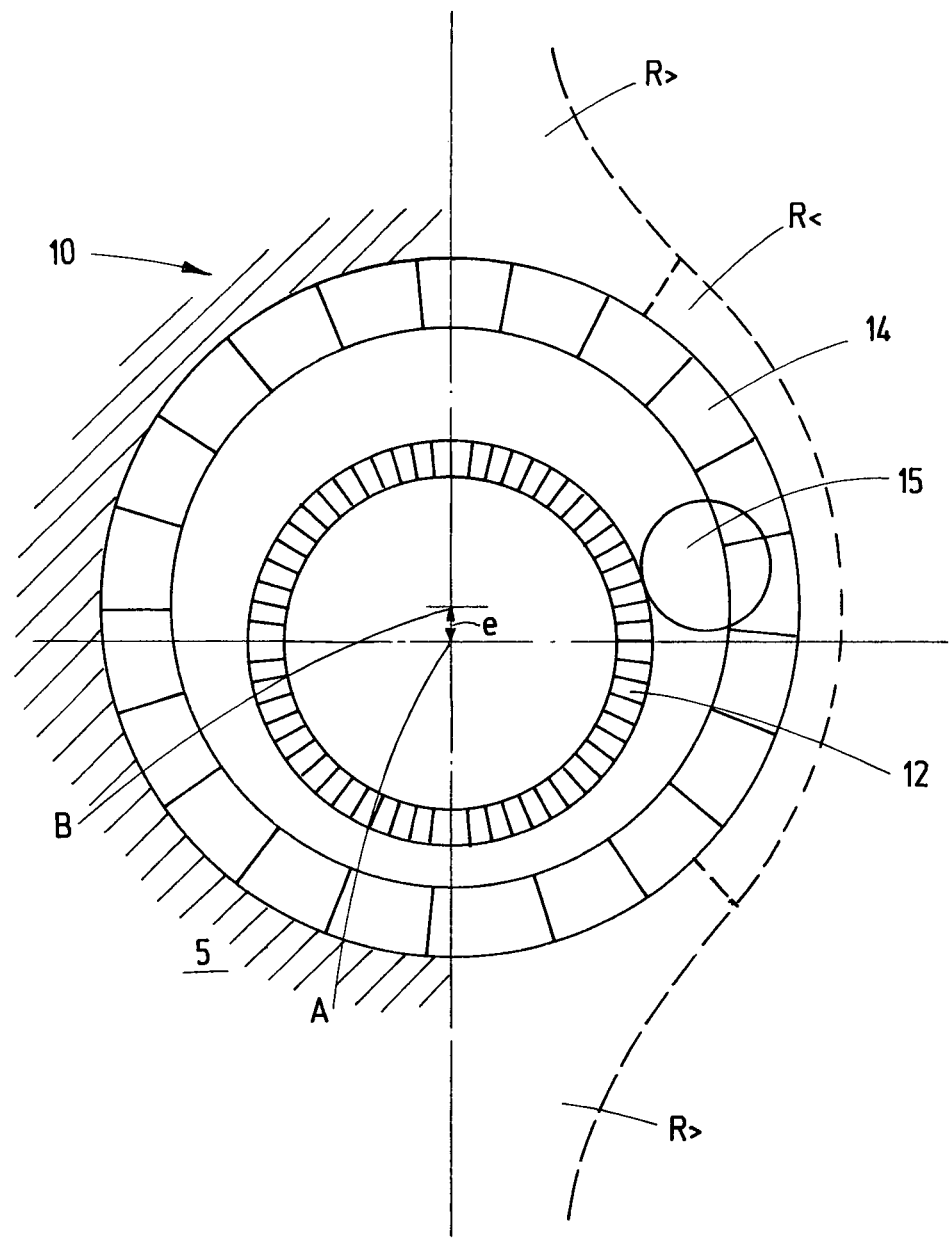
FIG. 1 is a cross sectional view through the first gear stage, with only one ball and, at the outer right-hand side, the radial load diagram thereof, being shown for the purpose of clarity.

Referring to the drawings in particular, an actuating drive 1 for a vehicle seat 3 has a housing 5 and a drive motor 7 arranged in the housing 5. The housing 5 is generally of multi-part design, but formed with as few parts as possible. The drive motor 7, which is formed in the present case as an EC inner-rotor-type motor, comprises a rotor 8 which is mounted in the housing 5 so as to be rotatable about a first axis A and which bears permanent magnets, and an electronically commutated stator 9. The rotor 8 is mounted in the housing 5 by means of two rotor bearings 8a which are designed as rolling bearings.

The actuating drive 1 also has a first gear stage 10 which comprises a drive input 12 rotatable about the first axis A and a drive output 14 rotatable about a second axis B which is parallel thereto, which drive input 12 and drive output 14 are each mounted in the housing 5. The drive input 12, which in the present case is of annular design, is preferably formed in one piece with the rotor 8 of the drive motor 7 and thereby rolling-bearing-mounted in the housing 5 by means of the rotor bearing 8a. It is however also possible for the rotor 8 and drive input 12 to be provided separately with suitable coupling and separate mounting in the housing 5. The drive output 14, which in the present case is likewise of annular design, is mounted in the housing 5 by means of a drive output bearing 14a which is likewise designed as a rolling bearing. Here, the first axis A and the second axis B are spaced apart from one another by an eccentricity e by virtue of the rotor bearing 8a and the drive output bearing 14a being arranged fixedly with respect to one another in the housing 5. In the illustration of FIG. 1, the second axis B is offset in the upward direction in relation to the first axis A. The position of the eccentricity e is therefore spatially fixed in relation to the housing 5.

In relation to a cylindrical coordinate system defined by the second axis B, the drive input 12, which has a relatively small diameter, is arranged radially at the inside and the drive output 14, which has a relatively large diameter, is arranged radially at the outside. In the present design as a friction wheel gear stage, the transmission of force between the drive input 12 and the drive output 14 takes place by means of at least one rolling body 15 (a ball 15 or some other rolling body 15) which is arranged between the drive input 12 and drive output 14, where a curved, wedge-shaped free space, referred to for short as the wedge gap, is formed between the drive input 12 and drive output 14. When the drive input 12 rotates, the ball 15 is automatically clamped in the direction of the wedge gap (clockwise in the illustration of FIG. 1), then rotates about its own axis and thereby drives the drive output 14. In the present case, precisely one ball 15 (or some other rolling body) is provided between the drive input 12 and drive output 14 for each drive direction, which balls or other rolling bodies act in the same way (with the exception of the rotational direction).

With regard to the transmission ratio of the first gear stage 10, in which now all the components involved rotate only about their own axes, the known ratios apply, specifically firstly the ratio of the circumferences or radii of the drive input 12 to drive output 14, and secondly, multiplicatively, the transmission ratio of the balls 15 themselves. By means of contours on the drive input 12 and/or drive output 14, the contact points with respect to the ball 15 can be shifted out of the plane which is perpendicular to the axes A and B and which serves as the plane of the drawing in FIG. 1. Other effective radii of the balls 15, that is to say drive input radius and drive output radius, then emerge as a projection in the plane, as a result of which the transmission ratio of the ball 15 changes. The drive output 14 is preferably provided on the— radially inwardly pointing—active surface with a contour, for example a channel or a V-shaped groove or the like within which the ball 15 runs and, in so doing, rolls on oblique walls. In this way, the drive output radius of the ball 15 can be reduced, even set to be smaller than the drive input radius, and the transmission ratio thereby manipulated. For example, a step-up transmission ratio can be generated by using a V-shaped groove on the drive input and a cylindrical surface on the drive output. This is the advantage—aside from the direct transmission of the radial forces—of a friction wheel gear stage over a gearwheel gear stage.

If the drive input torque is regarded as a constant, the eccentricity e results in an angle between the lines of force action of the forces acting on the ball 15 and a radial force which is proportional to the tangent of the angle, the magnitude and direction of which radial force is plotted in FIG. 1 as a radial load diagram on the outer side of the drive output 14. Viewed across all possible ball positions, the magnitude of the radial force twice assumes a (theoretically infinite) maximum value and a minimum value. If, for example, the ball 15 in FIG. 1 is situated in the vicinity of the 12 o'clock or 6 o'clock positions, that is to say in a prohibited angle range R>, then the wedge angle is minimal, and the smallest tangential drive forces of the drive input 14 lead to exorbitant radial forces and therefore to extreme deformations in real components with limited strengths. Conversely, for the mounting of the drive input 12 and drive output 14, this relationship means that, for real bearings with maximum permissible bearing forces, at a given maximum torque of the drive 12, the ball 15 may be operated only in a precisely definable permitted angle range R<(approximately between 1 o'clock and half past 4 in the radial load illustration of FIG. 1). The same naturally applies for the loading of the ball 15 itself.

The described radial forces, which reach a minimum at precisely one point, must be absorbed in the bearing arrangements and in the ball contact point, and inevitably lead to losses there. A preferred embodiment with maximum efficiency is consequently the variant in which the ball position is arranged precisely in the region of the minimum radial forces, which is dependent not only on the magnitude of the eccentricity e but also on the diameter ratios.

The described first gear stage 10 with fixed-position eccentricity may fundamentally be used in any desired combinations with other gear stages. In the present case, the actuating drive 1 has a second gear stage 20. The first gear stage 10 serves as an upstream stage for the second gear stage 20 arranged at the drive output side.

Figure 2:
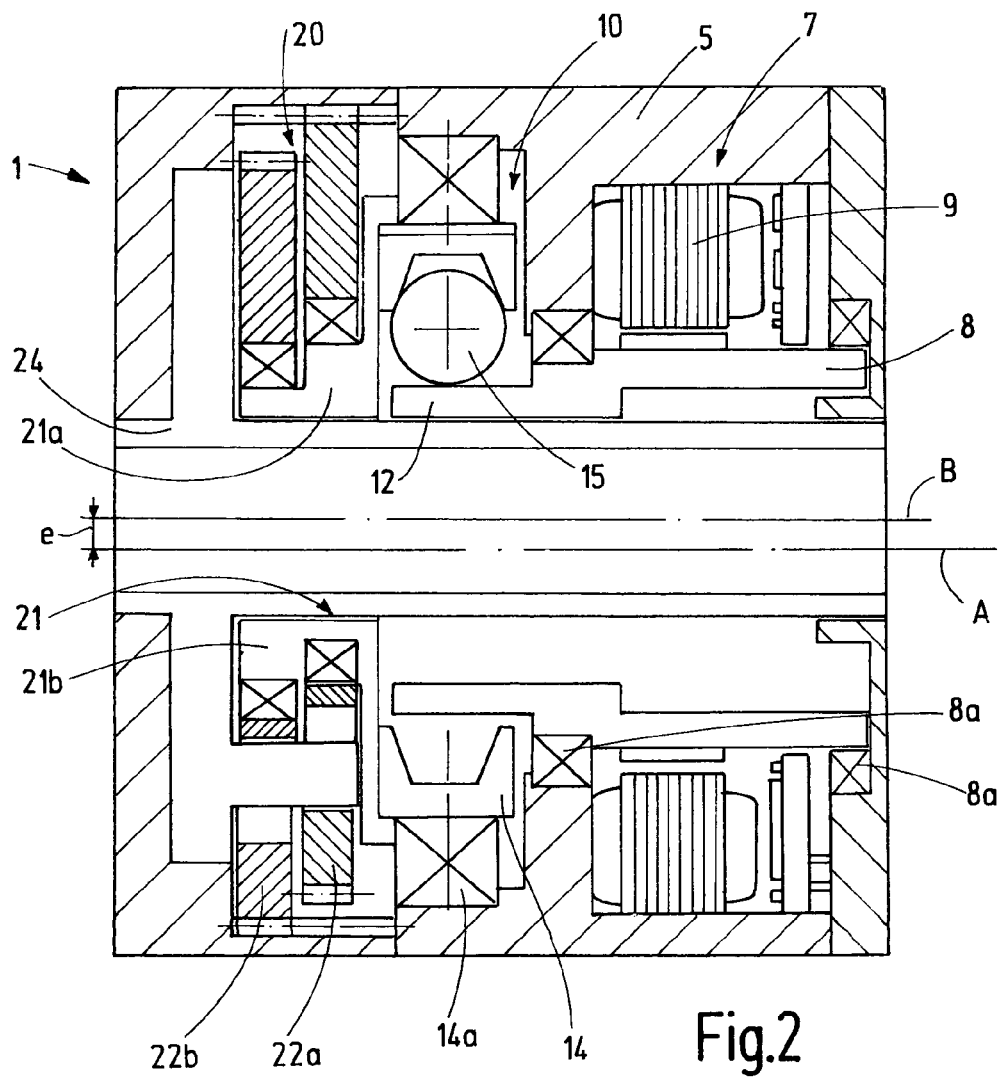
FIG. 2 is a longitudinal sectional view through an actuating drive with a drive motor, first gear stage and second gear stage.

In the present case, the second gear stage 20 is designed as a toothed eccentric epicyclic gear. A drive input shaft 21 which is rotatable about the second axis B serves by means of its first eccentric section 21a, and a second eccentric section 21b offset axially along the second axis B, to mount two pinions 22a and 22b which are preferably offset by 180° with respect to one another and which are arranged in two planes. Both the first pinion 22a and also the second pinion 22b, which are preferably of identical design, are externally toothed and mesh with an internal toothing of the housing 5 which has a number of teeth greater than that of the pinions 22a and 22b by at least one. During the rotation of the drive input shaft 21 which is connected centrally and fixedly to the drive output 14, the pinions 22a and 22b perform a rolling movement on the housing 5. The pinions 22a and 22b act by means of bolts and bores on a common drive output shaft 24 which is designed as a hollow shaft and which then likewise rotates. In the present case, the drive input shaft 21 and also the drive output shaft 24 are concentric with respect to the second axis B, such that the drive motor 7 is ultimately arranged offset with respect to the two-stage gearing assembly, composed of first gear stage 10 and second gear stage 20, overall by the eccentricity e which is fixed in terms of position and magnitude by the common housing 5. The extremely high number of rolling bearings in FIG. 2 serves to increase the overall efficiency. In modified embodiments, however, it is also possible for plain bearings to be used.

Figure 3:
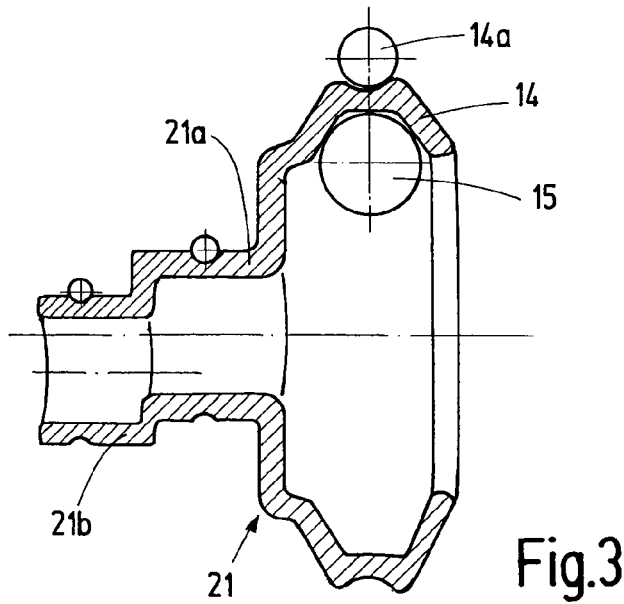
FIG. 3 is a longitudinal sectional view through a sleeve which serves as a drive output of the first gear stage and as a drive input shaft of the second gear stage.

As a design detail solution, it is preferably provided that the annular drive output 14 of the first gear stage 10 and the drive input shaft 21, which is connected thereto and designed as a double eccentric shaft, of the second gear stage 20 are formed in one piece as a sleeve with all the required ball running channels, and that preferably the sleeve is produced by non-cutting shaping and calibration processes. This is shown by FIG. 3.

On account of the position of the eccentricity e, and therefore also of the balls 15, now being spatially fixed relative to the housing 5, under operating conditions, a multiplicity of new solution possibilities arises both with regard to structural design and also with regard to overall functionality. Some advantageous aspects are explained below.

Figure 4:
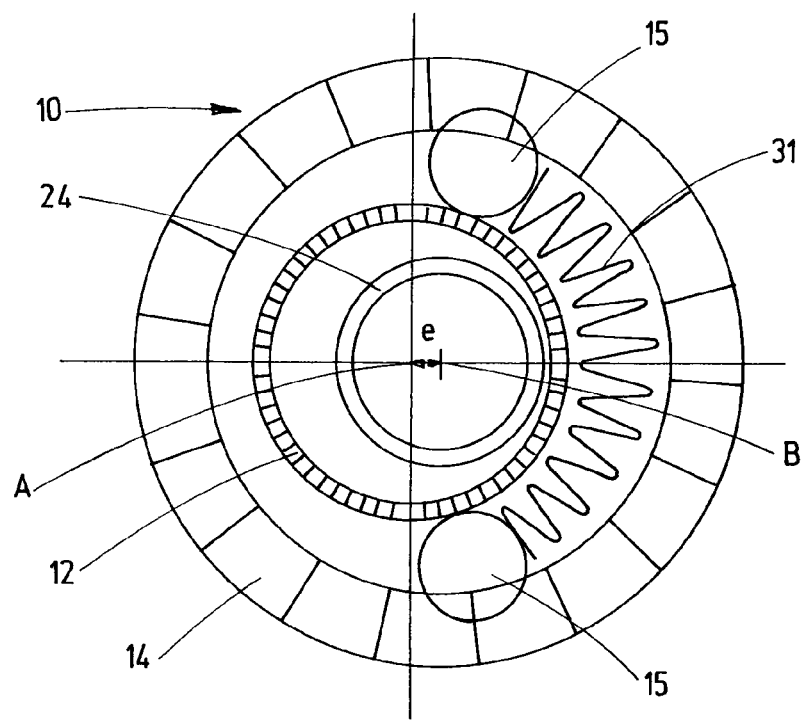
FIG. 4 is a cross sectional view through the first gear stage with a spiral compression spring as a pressure-exerting element.
Figure 5:
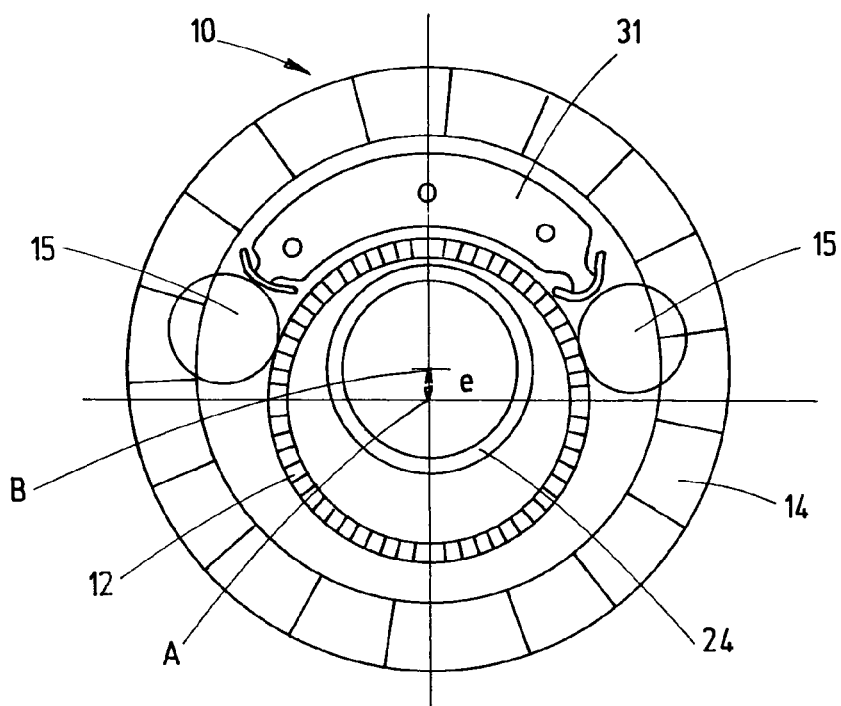
FIG. 5 is a cross sectional view through the first gear stage with a leaf spring as a pressure-exerting element.

In the known rotating rolling eccentric designs, the balls 15 rotate in space and the pressure-exerting element 31 for generating an ever-present low pressure force for the balls 15 must inevitably likewise co-rotate. A simple and frequently used solution here is spiral compression springs as illustrated in FIG. 4. However, the spiral compression springs tend toward natural vibrations and are in forced, loss-afflicted contact both with the balls 15 and also with the drive output 14. On account of the position now being fixed with respect to the housing 5, it is possible to realize considerably more advantageous designs for the pressure-exerting element 31, such as for example the use of a metal or plastic leaf spring, which is fixed to the housing, with a minimal ball contact surface, as illustrated in FIG. 5.

As a possibly economically worse but technically more elegant, virtually loss-free and noise-free design, it is expedient, when using balls 15 composed of steel, for magnets as pressure-exerting elements 31 for generating a contact-free pressure force to be positioned fixedly with respect to the housing, as illustrated in FIG. 6.

In all cases, the balls 15 are pushed or pulled into the wedge gap by the pressure-exerting element or elements 31, and are thereby simultaneously pressed against the drive input 12 and drive output 14. Viewed from a design systematic aspect, the balls 15 with their forces acting at an angle to one another ultimately simultaneously constitute a clamping roller or, in this case, clamping ball freewheel. The freewheel constitutes a self-switching clutch. In operation, that is to say during the drive movement, therefore, only the ball 15 which is moved further into the wedge gap by the drive input 12 will remain in contact both with the drive input 12 and also with the drive output 14. The opposite ball 15 for the opposite drive direction is, despite the pressure-exerting element 31, moved out of the wedge gap which is assigned thereto and then loses the double contact.

The action as a clamping roller or clamping body freewheel may, in some cases of drive technology, by all means be co-utilized in an expedient combination. FIG. 7 shows the rear region of a motor vehicle with an electrically unlockable backrest lock 33 at the upper edge of the backrest 35 of the vehicle seat 3. To enable the vehicle interior space to be changed in a comfortable and fast manner, arrangements are known in which the backrest 35 is installed so as to be spring-loaded in the forward direction and is releasably locked. Therefore, when the backrest lock 33 is electrically released, the backrest 35 pivots forward automatically. To re-assume the illustrated position, the backrest 35 must be pivoted up again manually.

A further increase in comfort of the function can be obtained firstly by means of possibly controlled damping of the spring-induced forward pivoting function and secondly by means of an electric pivoting-up facility. Both may be achieved by means of a variant of the actuating drive 1 with a design according to the invention of the first gear stage 10 with fixed-position eccentricity and in a friction wheel embodiment if the downstream gear stages are not self-locking, which is entirely expedient in the described application.

FIG. 8 shows a gearing variant which operates with only one, in this case magnetically pre-loaded ball 15. The actuating drive 1 with the first gear stage 10 is integrated into a fitting which serves as a backrest inclination adjuster. If, in the position shown in FIG. 7, the backrest 35 is electrically unlocked at its upper edge and then pivots forward, that is to say counterclockwise in FIG. 7, then the drive output 14 in FIG. 8 likewise rotates counterclockwise, maintains contact with the drive output 12 and therefore drives the rotor 8. In the present case of an EC motor, the rotor 8 may be acted on either without a braking moment or with a precisely controlled braking moment, for example in order to define a maximum pivoting speed or brake the movement shortly before the end of the possible movement angle. If the backrest 35 is later to be pivoted back up again electrically, the rotor 8 is in the present case operated counterclockwise and the drive output 14 and the backrest 35 rotate clockwise in FIGS. 7 and 8. It is also a peculiarity that the motor-driven movement of the backrest 35 can be manually overrun ("overrun function"). In the event of a torque being introduced at the drive output 14, that is to say an acceleration of the drive output 14 imparted externally, the clamping ball freewheel specifically opens automatically, that is to say the ball 15 moves out of the wedge gap, the drive input 12 runs freely and the backrest 35 can be pivoted up manually. This allows the backrest 35 to be pivoted up purely manually even for example in the event of an electrical failure or in emergency situations.

Figure 9:
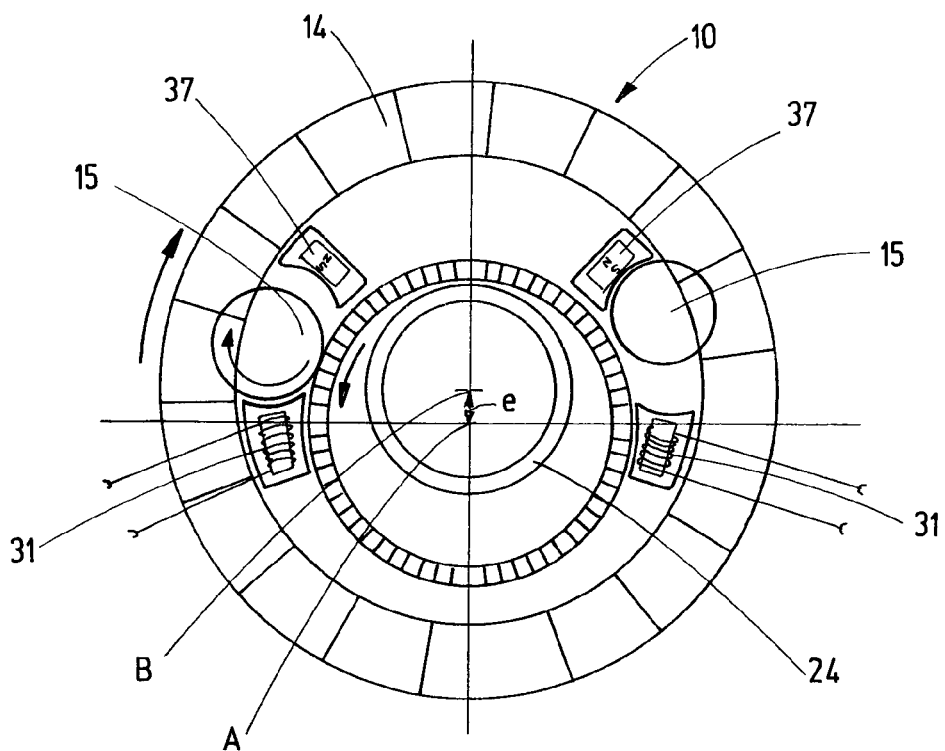
FIG. 9 is a cross sectional view through the first gear stage with an electric clutch function.

On account of the physical conditions at the ball 15, which in the case just described lead to an automatic decoupling of the first gear stage 10, the first gear stage 10 can in an extremely simple manner be expanded to encompass a further function often required in drive technology, specifically that of a switched clutch function, which may if required even be direction-dependent. FIG. 9 shows an arrangement in which the two balls 15 can be switched in each case into a passive and an active position independently of one another. For both balls 15, a retaining device 37 (in the present case a simple geometry with a very weak magnet) is provided in the upper region of the free space between the drive input 12 and drive output 14. The retaining device 37 positions the ball 15 in the rest position such that the latter is not in contact at least with the drive input 12 and/or drive output 14 (that is to say at least with one or possibly both components), as a result of which, in the rest position, the drive input 12 and drive output 14 are fully decoupled from one another. In the lower region of the free space, two separate and separately switchable electromagnets are provided as pressure-exerting elements 31 which, when activated, attract the respectively associated ball 15 and thereby close the frictional connection for the respective movement direction. Since the ball pressure forces required at relatively high torques are automatically adjusted in operation on account of the wedging action, the clutch can be switched with minimal energy, which need merely ensure "loose" contact at the start of movement. The electromagnets which are used as pressure-exerting elements 31 may consequently be switched into the currentless state in operation.

Figure 10:
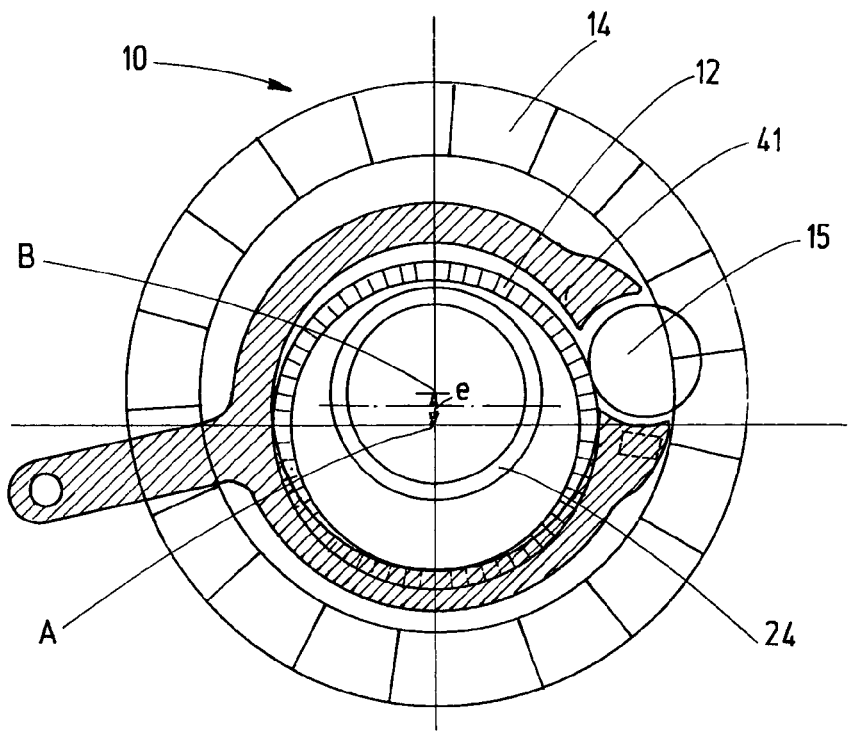
FIG. 10 is a cross sectional view through the first gear stage with a mechanical clutch function by means of a shift fork.

In addition to the electric actuation of the clutch function just described, a mechanical solution can also be realized. In the exemplary embodiment according to FIG. 10, for example, use is made of control forks 41, of which only one is illustrated. A control fork 41 of the type can be activated externally. The activated control forks 41 move the balls 15 in each case into active (into the wedge gap) or passive (out of the wedge gap) positions and thereby enable the drive motor 7 to be decoupled, for example in order to enable a manual quick adjustment or, again, an emergency actuation as described above in conjunction with FIGS. 7 and 8.

Figure 11:
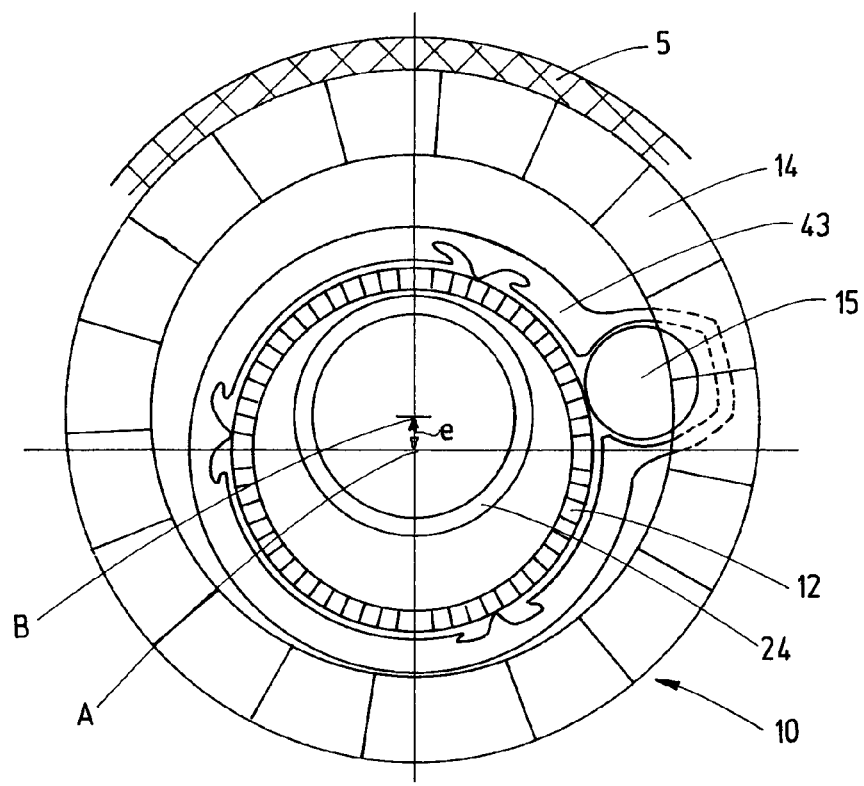
FIG. 11 is a cross sectional view through the first gear stage with a mechanical clutch function by means of frictional contact.

A further advantageous embodiment of a clutch function is illustrated in FIG. 11, which shows a ball-guiding ring 43 which surrounds the drive input 12 and which is in light frictional contact with the latter at three points and which guides the ball 15. The ball-guiding ring 43 will as a tendency, on account of the weak frictional contact with the drive input 12, seek to always move the ball 15 within the free space in the drive direction of the rotor 8 (that is to say into the wedge gap) and consequently, in the coupled state, maintain its own angle position and also that of the ball 15. In contrast, in the event of a rotational direction reversal, the ball 15 will—having been released from its previous contact—be pivoted onto the opposite side. The resulting saving of a second ball 15 is of less significance here than the fact that, with the arrangement, it is possible without further active actuating elements or magnets for the gearing to be fully decoupled by virtue of the rotor 8 (and therefore the drive input 12) being rotated back by a known angle (approximately 80° counterclockwise in the illustration of FIG. 11) after the end of the drive movement. This makes it possible for stresses in the entire actuating drive 1 to be relieved in a controlled fashion, and for example allows the drive input or drive output bearing arrangements to be encased with an elastomer ring for the purpose of reducing body-borne noise transmission or also for the purpose of targetedly controlling the elastic displacements of the gearing elements in operation under load. A side-effect to be noted here is that such a design also permits the use of non-magnetic ball materials such as for example ceramic or plastic.

Figure 12:
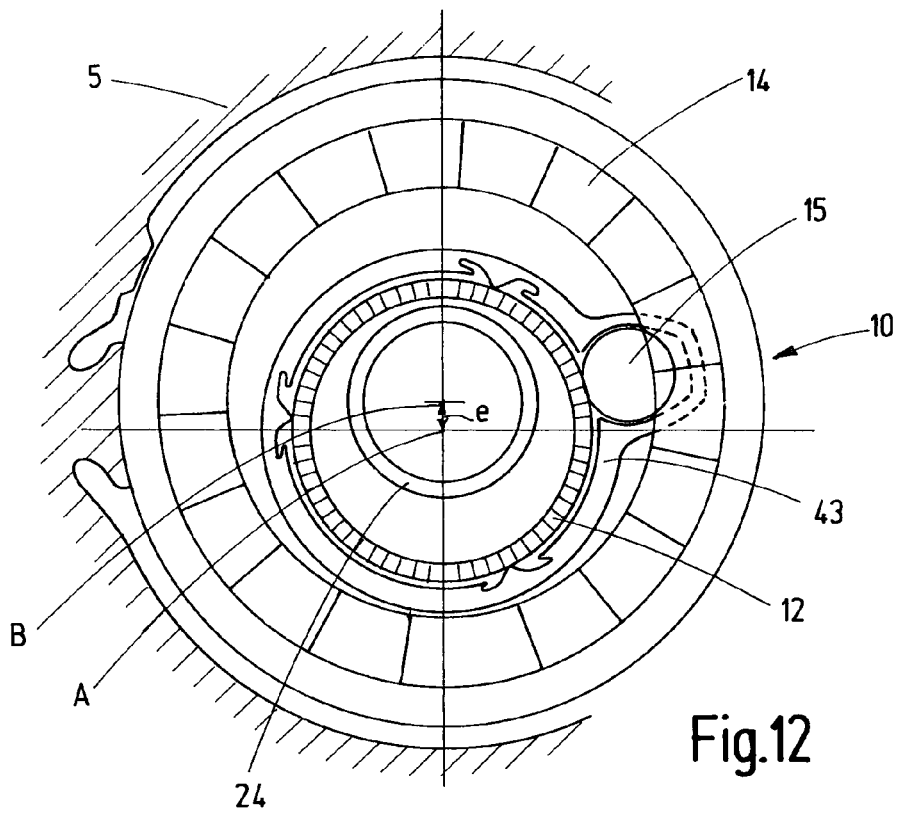
FIG. 12 is a cross sectional view through the first gear stage with a housing with different bearing stiffnesses.

FIG. 12 shows a conceivable design with a housing 5 which is intentionally provided with different bearing stiffnesses. With the different bearing stiffnesses—which are dependent on the spatial directions—it is for example possible for the radial forces to be reduced. This is a modification of the embodiment of FIG. 11. In particular when thermoplastics are used as a housing material, it is recommendable for the first gear stage 10 to be decoupled in order to minimize material creep over relatively long standstill periods at high temperatures.

Figure 13:
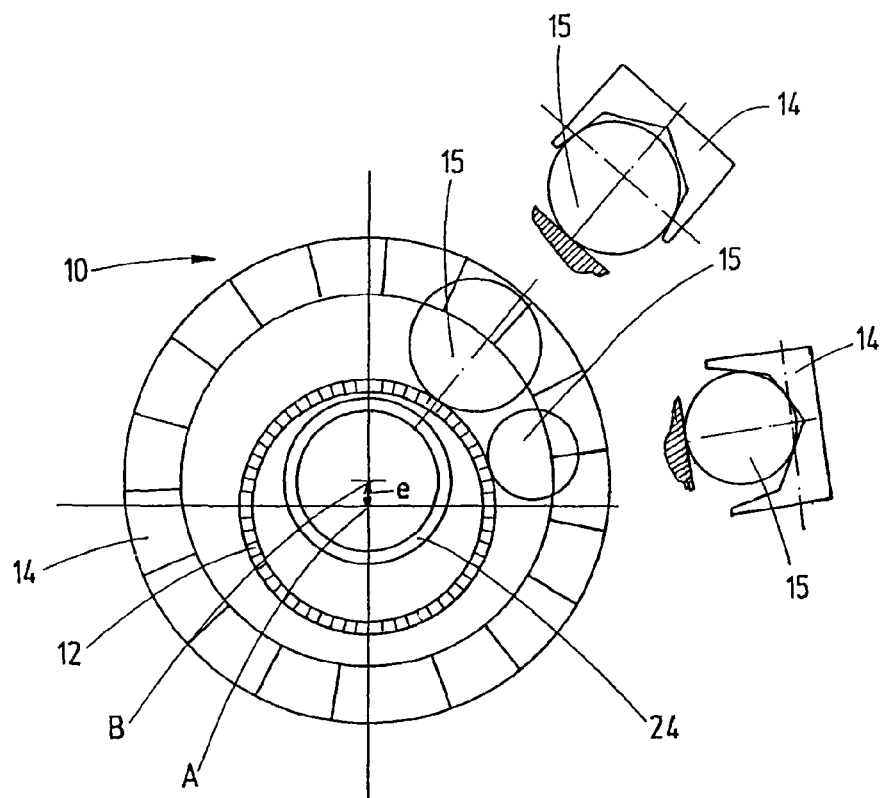
FIG. 13 is a cross sectional view through the first gear stage with different transmission ratios and two longitudinal sections in the region of the two balls.
Figure 14:
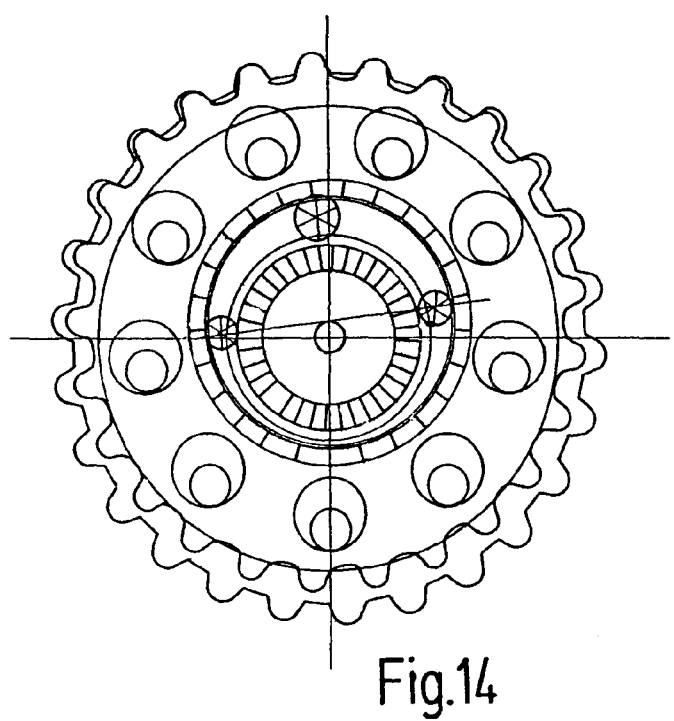
FIG. 14 is a cross sectional view through a gear stage according to the prior art.

With the described possibilities of the coupling and decoupling of balls 15, it is obtained as a consequence that the first gear stage 10 may also be formed as a gearing with different, direction-dependent or switchable transmission ratios. FIG. 13 shows, by way of example, a stepped inner contour of the drive output 14. In combination with the spacing, which differs on account of the eccentricity e, to the drive output 12, balls 15 of different size are in contact with the inner contour. The transmission ratios can therefore be switched by decoupling the one ball 15 and coupling the other ball 15. In the field of the drives, movement-direction-dependent power and torque requirements are common. With the switching facility, it is possible for different load situations (seat height adjuster upwards—high torque, seat height adjuster downwards—low torque) for a suitable transmission ratio for each rotational direction to be installed from the start. It is also possible for more than two transmission ratios to be installed according to the same principle.

Alternatively to the design shown in FIG. 13 with two balls 15 of different transmission ratio in a single drive output 14, it is of course also possible for the contact geometries of the drive input 12 to be defined in the same way, or one or more drive outputs 14 (or drive inputs 12) may be arranged axially one above the other, or two different contours may be provided on the drive output 14 (or drive input 12). It is also possible for other rolling bodies to be provided instead of the balls 15.

While specific embodiments of the invention have been described in detail to illustrate the application of the principles of the invention, it will be understood that the invention may be embodied otherwise without departing from such principles.

The invention claimed is:

1. A gear stage of a vehicle seat, the gear stage being a friction wheel gear stage comprising:
   a housing;
   a drive input;
   a drive output spaced apart from the drive input by an eccentricity;
   for each drive direction, precisely one rolling body provided for transmitting force between the drive input and drive output, a position of the eccentricity with respect to the housing being spatially fixed; and
   a pressure-exerting element comprising at least one of a spring fixed to the housing and a magnet, which pushes or pulls the rolling body into a wedge gap between the drive input and drive output.

2. The gear stage as claimed in claim 1, further comprising bearings for the drive input and drive output arranged at spatially fixed points in the housing.

3. The gear stage as claimed in claim 2, wherein the housing has different bearing stiffnesses for the bearings of the drive input and of the drive output and/or for different drive directions and/or different spatial directions.

4. The gear stage as claimed in claim 1, wherein the rolling body in operation, is only precisely one rolling body in contact both with the drive input and also with the drive output.

5. The gear stage as claimed in claim 1, wherein a free wheel is formed which opens as a result of a torque introduced at the drive output by virtue of the rolling body moving out of a wedge gap between the drive input and drive output.

6. The gear stage as claimed in claim 1, wherein a switchable clutch in which the rolling body is moved out of or into a wedge gap between the drive input and drive output electrically by means of a combination of a retaining device and a pressure-exerting element, and/or mechanically by means of a control fork or configured frictional contact.

7. The gear stage as claimed in claim 1, wherein, after the end of a drive input movement, the drive input is rotated back by a predefined angle in order to move the rolling body out of a wedge gap between the drive input and drive output.

8. The gear stage as claimed in claim 1, wherein a gear with two different direction-dependent and/or switchable transmission ratios is formed with the rolling body comprising two different balls and/or contours on the drive input and/or drive output.

9. The gear stage as claimed in claim 1 wherein the rolling body is a ball.

10. A gear stage arrangement comprising:
    a housing;
    a drive input;
    a drive output spaced apart from the drive input by an eccentricity, a position of the eccentricity with respect to the housing being fixed;
    a first rotational direction rolling body arrangement provided for transmitting force between the drive input and drive output in a first rotational direction to form a friction wheel gear stage, the first rotational direction rolling body arrangement comprising only a single rolling body as an only driving structure transmitting force between the drive input and the drive output in the first rotational direction and the only driving structure driving the drive output in the first rotational direction, the rolling body being movable in a space between the drive input and the drive output and a pressure-exerting element fixed to the housing, which pushes or pulls the single rolling body in a direction perpendicular to and axial direction into a wedge gap in the space between the drive input and drive output.

11. The gear stage arrangement as claimed in claim 10, further comprising:
    a drive motor driving the friction wheel gear stage.

12. The gear stage arrangement as claimed in claim 10, further comprising:
    a vehicle seat with a seat part and a backrest, the friction wheel gear stage being connected to the vehicle seat for controlled movement of the backrest relative to the seat part.

13. The gear stage arrangement as claimed in claim 10, further comprising:
    a drive input bearing rotationally supporting the drive input; and
    a drive output bearing rotationally supporting the drive output, the drive input bearing and the drive output bearing being arranged at spatially fixed points in the housing.

14. The gear stage arrangement as claimed in claim 13, wherein the drive input bearing has a different bearing stiffness from the bearing stiffness of the drive output bearing.

15. The gear stage arrangement as claimed in claim 13, wherein the rolling body moves out of the wedge gap between the drive input and drive output as a result of a torque introduced at the drive output.

16. The gear stage arrangement as claimed in claim 13, wherein a switchable clutch is formed in which the rolling body is moved out of or into a wedge gap between the drive input and drive output by at least one of mechanically and electrically.

17. The gear stage arrangement as claimed in claim 10, further comprising:
    a second direction rolling body arrangement provided for transmitting force between the drive input and drive output only in a second rotational direction, the second direction rolling body arrangement comprising only a single rolling body as an only driving structure transmitting force between the drive input and the drive output in the second rotational direction and the only driving structure driving the drive output in the second rotational direction and a pressure-exerting element, which pushes or pulls the single rolling body in a direction perpendicular to and axial direction into a wedge gap between the drive input and drive output, the pressure-exerting element of the second direction rolling body arrangement being in common with the pressure-exerting element of the first direction rolling body arrangement or being independent of the pressure-exerting element of the first direction rolling body arrangement.

18. A gear stage arrangement comprising:
a housing;
a drive input rotating about a drive input axis;
a drive output rotating about a drive output axis spaced apart from the drive input axis by an eccentricity, a position of the eccentricity with respect to the housing being fixed;
a rolling body arrangement for transmitting force between the drive input and drive output to form a friction wheel gear stage driving the drive output in at least one of a first rotational direction of drive and a second rotational direction of drive, the rolling body arrangement comprising for each direction of drive only a single rolling body as an only driving structure transmitting force between the drive input and the drive output in a rotational direction and the only driving structure driving the drive output in the rotational direction, the single rolling body being movable relative to the drive input axis and relative to the drive output axis, and a pressure-exerting element which pushes or pulls the single rolling body, in at least one of a circumferential and radial direction, into a wedge gap between the drive input and drive output.

* * * * *